(12) United States Patent
Durand et al.

(10) Patent No.: US 9,027,876 B2
(45) Date of Patent: May 12, 2015

(54) DEVICE FOR SUSPENDING A TURBINE ENGINE FROM AN AIRPLANE

(75) Inventors: Didier Noël Durand, Pontault Combault (FR); Gaël Evain, Fontenay-Tresigny (FR); Florence Irène Noëlle Leutard, Samoreau (FR); Arnaud Martin, Le Vernet (FR)

(73) Assignee: Snecma, Paris (FR)

( * ) Notice: Subject to any disclaimer, the term of this patent is extended or adjusted under 35 U.S.C. 154(b) by 0 days.

(21) Appl. No.: 14/008,943

(22) PCT Filed: Mar. 21, 2012

(86) PCT No.: PCT/FR2012/050589
§ 371 (c)(1),
(2), (4) Date: Dec. 4, 2013

(87) PCT Pub. No.: WO2012/131233
PCT Pub. Date: Oct. 4, 2012

(65) Prior Publication Data
US 2014/0077027 A1    Mar. 20, 2014

(30) Foreign Application Priority Data
Mar. 29, 2011 (FR) ..................... 11 52607

(51) Int. Cl.
*B64D 27/00* (2006.01)
*B64D 27/26* (2006.01)

(52) U.S. Cl.
CPC .......... *B64D 27/26* (2013.01); *B64D 2027/266* (2013.01)

(58) Field of Classification Search
CPC ....................................................... B64D 27/26
USPC ......... 248/554, 555, 556, 557, 580, 584, 589, 248/591, 608, 610, 635; 244/54; 384/428, 384/438
See application file for complete search history.

(56) References Cited

U.S. PATENT DOCUMENTS

| | | | | | |
|---|---|---|---|---|---|
| 2,091,679 | A | * | 8/1937 | Grant | 267/141.1 |
| 4,065,077 | A | * | 12/1977 | Brooks | 244/54 |
| 4,943,013 | A | * | 7/1990 | Kapala et al. | 244/54 |
| 5,860,623 | A |  | 1/1999 | Dunstan et al. | |
| 5,873,559 | A | * | 2/1999 | von Flotow et al. | 248/557 |

(Continued)

FOREIGN PATENT DOCUMENTS

| EP | 0 872 418 A2 | 10/1998 |
|---|---|---|
| EP | 0 940 337 A1 | 9/1999 |

OTHER PUBLICATIONS

International Search Report issued Jul. 25, 2013, in International application No. PCT/FR2012/050589.

*Primary Examiner* — Terrell McKinnon
*Assistant Examiner* — Michael McDuffie
(74) *Attorney, Agent, or Firm* — Oblon, McClelland, Maier & Neustadt, L.L.P.

(57) ABSTRACT

A device for suspending a turbojet casing, the device including a shouldered pin extending through aligned orifices of two lugs of a clevis secured to the casing. A protection piece for providing protection against wear is mounted on each lug of the clevis and has the shouldered pin passing therethrough, the protection piece being prevented from moving in rotation on the lug by co-operating shapes.

10 Claims, 2 Drawing Sheets

(56) References Cited

U.S. PATENT DOCUMENTS

| | | | |
|---|---|---|---|
| 6,209,822 B1* | 4/2001 | Le Blaye | 244/54 |
| 6,637,736 B2* | 10/2003 | Eller et al. | 267/279 |
| 7,097,169 B2* | 8/2006 | Mueller | 267/141.1 |
| 7,165,743 B2* | 1/2007 | Pasquer et al. | 244/54 |
| 7,566,029 B2* | 7/2009 | Dron et al. | 244/54 |
| 8,020,831 B2* | 9/2011 | Dron et al. | 248/554 |
| 8,561,941 B2* | 10/2013 | Combes et al. | 244/54 |
| 2005/0269445 A1 | 12/2005 | Chevalier et al. | |
| 2008/0067286 A1* | 3/2008 | Cousin et al. | 244/54 |
| 2008/0272229 A1* | 11/2008 | Lafont et al. | 244/54 |
| 2009/0134270 A1* | 5/2009 | Renon et al. | 244/54 |
| 2010/0233001 A1* | 9/2010 | Jin | 418/55.1 |

\* cited by examiner

DEVICE FOR SUSPENDING A TURBINE ENGINE FROM AN AIRPLANE

BACKGROUND OF THE INVENTION

1. Field of the Invention

The present invention relates to a device for suspending a turbine engine such as a turbojet from a portion of an airplane.

2. Description of the Related Art

Conventionally, a turbojet comprises a plurality of casings in alignment and surrounding, from upstream to downstream: low and high pressure compressors; a combustion chamber; and high and low pressure turbines. The downstream end of the turbojet has an exhaust casing for exhausting the gas burnt in the combustion chamber. The outside surface of this casing includes means for suspending or attaching the turbojet to a portion of the airplane. These suspension means include clevises, each of which comprises two lugs having orifices in alignment for passing a shouldered pin that, in-between the lugs, passes through a member providing connection to a portion of the airplane.

In order to hold the shouldered pin inside the orifices of the lugs of the clevis, a nut is screwed onto one end of the shouldered pin, and at its end opposite from the nut, the pin has a projecting annular rim placed against the clevis. The fastener nut and the annular rim form abutments for axially retaining the shouldered pin in the clevis. In operation, the outside faces of the lugs of the clevis come into contact with the nut and with the annular rim, thereby leading to wear of the outside faces of the lugs of the clevises. This wear gives rise to grooves or furrows being formed in the outside faces of the lugs.

In order to avoid subjecting the outside faces of the lugs to wear, the Applicant has already proposed, in document FR 2 923 460, interposing respective antirotation washers between the outside faces of the lugs and the fastener nut at one end and the annular rim at the other end. Nevertheless, in operation, the clevises transmit thrust forces to the airplane and they are subjected to high levels of vibration, and it is found that the washers do not perform their antirotation function correctly, being subjected to repeated movements in rotation that wear the outside faces of the lugs. That type of movement of the washer is known as "fretting".

It is possible to carry out a repair by performing a grinding operation on the worn outside faces of the lugs. Such an operation consists in smoothing the outside faces of the lugs by means of an abrasive member put into rotary contact with the outside faces of the lugs. Nevertheless, such an operation can be performed only a limited number of times since it removes material from the lugs of the clevises. This results in a reduction in the thickness of the lugs and thus in their mechanical strength, and it also increases the clearance between the lugs and the abutments. Furthermore, the faces of the lugs that are restored in this way will continue to wear in operation.

This grinding operation requires the turbine engine to be removed, thereby increasing the length of time it is out of service and thus increasing the cost of operating the airplane. Finally, it is possible to perform grinding only when the depth of the wear is relatively shallow, being of the order of 0.1 millimeters (mm) to 0.2 mm, which requires the lugs of the clevises to be inspected regularly in order to be carry out the grinding before the wear has become excessive. When the wear is greater than about 0.5 mm, the casing must be replaced as a whole.

Given the regulations that are in force, it is not possible to envisage building up the outside faces of the lugs by tungsten inert gas (TIG) deposition.

BRIEF SUMMARY OF THE INVENTION

A particular object of the invention is to provide a solution to these various problems that is simple, inexpensive, and effective.

To this end, the invention provides a device for suspending a turbojet casing, the device comprising a shouldered pin extending through aligned orifices of two lugs of a clevis secured to the casing, the device being characterized in that a protection piece for providing protection against wear is mounted on each lug of the clevis and has the shouldered pin passing therethrough, this piece being prevented from moving in rotation on the lug by co-operating shapes.

Unlike the prior art in which the washers are prevented from moving in rotation by making contact, the protection pieces of the invention are prevented from moving in rotation by co-operating shapes.

Such wear protection pieces may be mounted on the lugs of a new casing or of a casing that is already in operation, during a maintenance operation.

The costs of operating the turbine engine are likewise reduced since the deep wear that requires the entire casing to be replaced is avoided. When a protection piece is worn, it suffices to replace it, and no maintenance operation is needed on the casing.

According to another characteristic, the protection piece has a wall covering an outside face of the lug and including an orifice for passing the shouldered pin, the orifice in the wall of the piece having a diameter that is less than the diameter of the shoulder of the pin.

According to yet another characteristic of the invention, the piece has two parallel walls, each covering one of the faces of a lug, together with a connection portion connecting these two walls together, the connection portion covering the top of the lug.

Advantageously, the connection portion is constituted by a bottom wall of an annular groove of shape complementary to the shape of the top of the lug. In this way, the bottom wall of the annular groove co-operates with the top of the lug in order to prevent the protection piece from moving in rotation.

In a particular embodiment of the invention, the top of the lug has at least a circular portion on which the bottom wall of likewise circular shape is engaged, the angular extents of the bottom wall and of the circular portion of the lug being identical.

In this embodiment, the ends of the bottom wall of the annular groove constitute abutments for preventing movement in rotation of the protection piece on the top of the lug.

Preferably, the two walls of the protection piece extend over different radial extents, the extent of the wall that covers the outside face of the lug being greater than the extent of the other wall that terminates radially short of the shouldered pin.

According to another characteristic of the invention, said other wall has a concave curved inside peripheral edge surrounding a portion of an annular rim of the orifice of the lug through which the shouldered pin passes.

The invention also provides a protection piece for protecting the outside face of a lug of a clevis in a suspension device as described above, the protection piece comprising two parallel walls connected together by a bottom wall in the shape of a sector of an annular groove, a first one of the parallel walls having a circular orifice and the other one having no such orifice and being of a radial extent that is less than that of the first wall.

Advantageously, the protection piece is made by stamping a metal sheet with thickness of about 1 mm.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
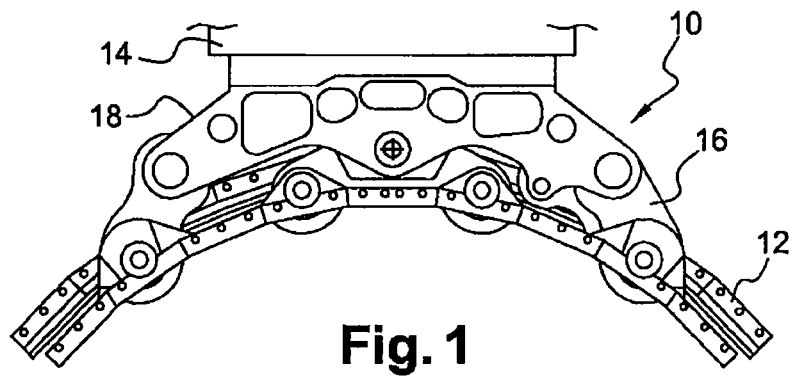
FIG. 1 is a fragmentary diagrammatic section view of a prior art device for suspending a turbojet casing.
Figure 2:
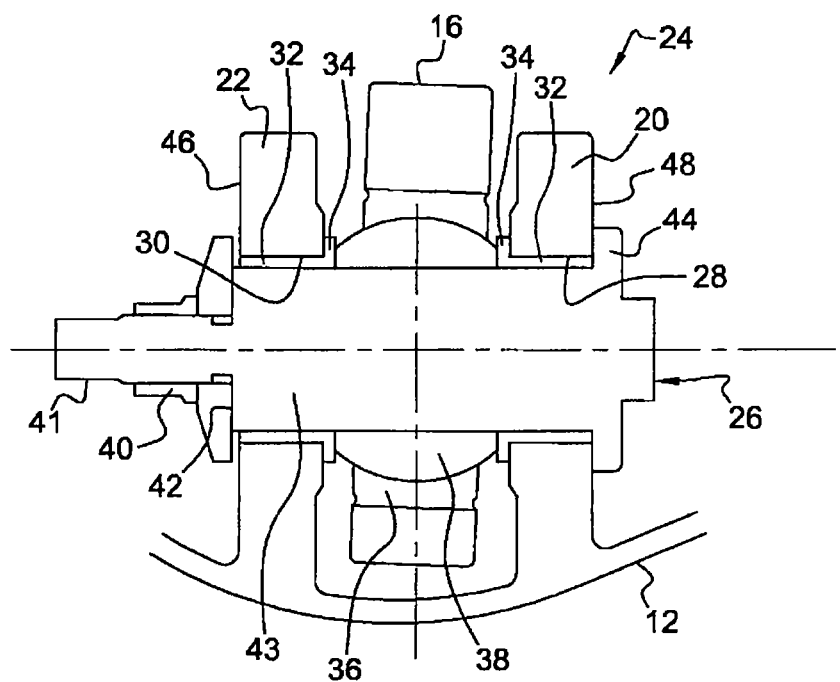
FIG. 2 is a diagrammatic view on a larger scale of a suspension clevis of the FIG. 1 device.

Reference is made initially to FIG. 1 which shows a portion of a device 10 for suspending a casing 12 of a turbine engine such as a turbojet from a portion of an airplane 14. Such a suspension device 10 comprises a plurality of links 16, each having one end connected to a suspension yoke 18 attached to a portion of the airplane 14. The other end of each link 16 is engaged between two lugs 20, 22 of a clevis 24 formed on the outer periphery of the casing of the turbojet, such as an exhaust casing arranged at the outlet from a low pressure turbine and guiding the ejection of the stream of hot gas coming from an upstream combustion chamber.

Each link 16 is hinged to two lugs 20, 22 of a clevis via a shouldered pin 26 passing through orifices 28 and 30 of the lugs 20 and 22. Respective bushings 32 are engaged from the inside of the clevis 24 into the orifices 28, 30 of each of the lugs 20, 22. Each bushing 32 has a radial annular rim 34 pressed against the inside face of one of the lugs 20, 22. The link 16 has a bore within which a cage 36 is fastened by crimping, the cage having a spherical inside surface. A ball 38 with a spherical outside surface is mounted stationary on the shouldered pin 26, inside the cage 36.

The shouldered pin 26 has an end 41 of small diameter with a fastener nut 40 screwed thereon. This end 41 extends outside the clevis and is connected via a shoulder 42 to an intermediate portion 43 of the pin that is of greater diameter and that is engaged in the bushings 32 in the orifices of the lugs of the clevis 24. The intermediate portion 24 is connected to an end rim 44 of the pin, this rim having a diameter greater than the diameter of the intermediate portion 43. The annular rim 44 and the nut 40 thus form abutments for axially retaining the pin 26 on the clevis 24. Operating clearance is provided between the outside faces of the lugs 20, 22 and the fastener nut 40 at one end and the annular rim 44 at the other end, so as to avoid the clevis 24 being subjected to lateral bending forces in operation.

In operation, the outside faces 46, 48 of the lugs 20, 22 are subjected to repeated contacts with the fastener nut 40 and with the annular rim 44, thereby leading to wear of these outside faces 46, 48.

Figure 3:
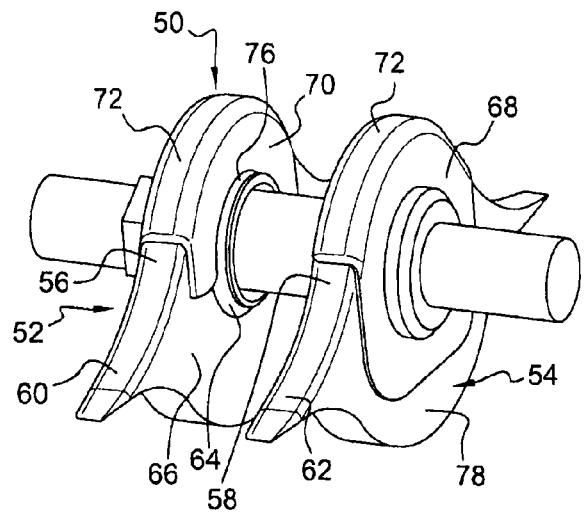
FIG. 3 is a diagrammatic perspective view of a clevis having two wear-protection pieces in a device of the invention for suspending a turbojet casing.
Figure 4:
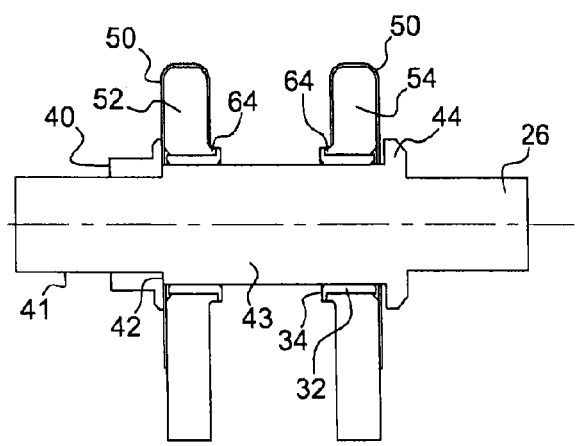
FIG. 4 is a diagrammatic view on a section plane containing the axis of the FIG. 3 clevis.
Figure 5:
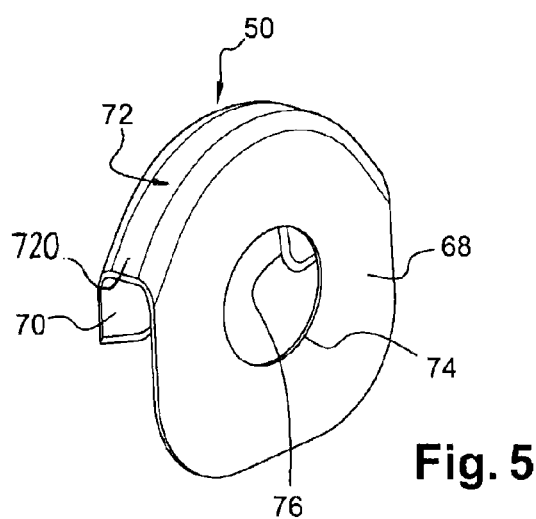
FIG. 5 is a diagrammatic perspective view of the protection piece of FIGS. 3 and 4.

The invention thus proposes solving this difficulty by means of a protection piece 50 for providing protection against wear and prevented from moving in rotation on a lug 52 or 54 by means of co-operating shapes (FIGS. 3 to 5).

FIG. 3 shows a clevis for suspending a casing of a turbojet, the clevis having a respective wear protection piece 50 mounted on each of the lugs 52, 54 of the clevis.

The top of each lug of the clevis has a portion 56, 58 of circular outline centered on the axis of the orifices for passing the shouldered pin 26. The ends of each of the circular portions 56, 58 are connected to concave curved portions 60, 62. The orifice in each lug has an annular rim 64 projecting from the inside face 66 of the lug, this rim surrounding the orifice for passing the shouldered pin 26.

A protection piece 50 of the invention comprises two parallel plane walls 68, 70 connected together by a connection portion 72 in the form of an annular groove extending over a little less than 180°. A first plane wall 68 includes an orifice 74 of diameter smaller than the diameter of the rim 44 of the pin. The second wall 70 extends radially over a distance that is less than the distance over which the first wall 68 extends and has a circularly arcuate concave inside peripheral edge 76. The connection portion 72 comprises a bottom wall 720 of an annular groove that is also defined by the first and second plane walls 68 and 70 and that presents a circularly arcuate shape centered on the axis of the orifice 74. The angular extent of the bottom wall 720 is identical to that of the circular portions 56, 58 at the tops of each of the lugs 52, 54.

The protection piece 50 is engaged on the top of a lug in such a manner that the first wall 68 is pressed against the outside face 78 of the lug, while the second wall 70 is pressed against the inside face 66 of the lug, the connection portion 72 being pressed against the top of the lug.

Thus, when a protection piece 50 is engaged on a lug of a clevis, the ends of the portion 72 come into abutment on the concave curved portions 60, 62 and prevent the protection piece 50 from moving in rotation relative to the lug 52, 54.

The annular rim 64 around each projecting orifice on the inside face 66 of each lug 52, 54 forms centering means and keying means for preventing the protection piece 50 being wrongly mounted on a lug 52, 54. In the event of an operator engaging the first plane wall 68 on the inside face 66 of a lug, the radially inner end of the wall 68 would come into abutment against the annular rim 64, thereby indicating that the protection piece 50 is wrongly mounted. Furthermore, the edge 76 of the wall 70 of the protection piece 50 comes into abutment against the annular rim 64 of the lug in order to define a correct position for mounting the piece 50 on the lug.

The invention thus provides means that are simple and effective for preventing the protection piece 50 from moving in rotation on a lug 52, 54 of the clevis. When the protection pieces 50 are worn, it suffices to replace them and no maintenance operation is needed on the outside faces of the lugs of the clevises since they have been protected against wear by the pieces 50, thus making it possible to guarantee that the lugs retain their mechanical strength of optimum transmission of forces from the turbine engine to the airplane.

The wear protection pieces 50 may be made by stamping a nickel alloy sheet that has a thickness of about 1 mm. The sheet may also be made of a material such as that known under the name Inconel 718 superalloy, having the chemical formula $NiCr_{19}FeNb_5Mo_3$.

Other embodiments are possible for the protection pieces. In particular, for a lug having a top that is not circular, it suffices for the connection portion to have a shape that is complementary to the shape of the top of the lug in order to guarantee that the protection piece is held against moving in rotation on the lug.

The invention claimed is:

1. A device for suspending a turbojet casing, the device comprising:
    a shouldered pin extending through aligned orifices of two lugs of a clevis secured to the casing, each lug having an inside face and an outside face; and
    a protection piece for providing protection against wear mounted on each lug and that has the shouldered pin passing therethrough, the protection piece being prevented from moving in rotation on the lug by co-operating shapes,
    wherein the protection piece includes first and second parallel walls, each of the parallel walls covering one of said faces of the lug, and a connection portion connecting the first and second parallel walls together, the connection portion covering a top of the lug,
    wherein said first and second parallel walls extend over different radial extents, an extent of one of said first and second parallel walls covering the outside face of the lug being greater than an extent of the other of said first and second parallel walls that terminates radially short of the shouldered pin, and,
    wherein said other of the first and second parallel walls includes a concave curved inside peripheral edge surrounding a portion of an annular rim of the orifice of the lug through which the shouldered pin passes.

2. A device according to claim 1, wherein, on each lug, the protection piece includes a wall covering the outside face of the lug and includes an orifice for passing the shouldered pin, the orifice in the wall of the protection piece having a diameter that is less than the diameter of the shoulder of the pin.

3. A device according to claim 1, wherein the connection portion includes a bottom wall of an annular groove of shape complementary to a shape of the top of the lug.

4. A device according to claim 3, wherein the top of the lug has a circular portion on which the bottom wall of likewise circular shape is engaged, angular extents of the bottom wall and of the circular portion of the lug being identical.

5. A piece for protecting an outside face of a lug of a clevis in a suspension device according to claim 1, the piece comprising first and second parallel walls connected together by a bottom wall in a shape of a sector of an annular groove, the first parallel wall having a circular orifice and the second parallel wall having no such orifice and being of a radial extent that is less than that of the first wall.

6. A protection piece according to claim 5, made by stamping a metal sheet with a thickness of about 1 mm.

7. A device for suspending a turbojet casing, the device comprising:
    a shouldered pin extending through aligned orifices of two lugs of a clevis secured to the casing, each lug having an inside face, an outside face, and an intermediate portion extending between said inside and outside faces, said intermediate portion having, at a top section, a curved outline centered on an axis of said aligned orifices which are adapted for passing therethrough the shouldered pin; and
    a protection piece for providing protection against wear mounted on each lug and that has the shouldered pin passing therethrough,
    wherein said protection piece comprises two parallel walls and a connection portion extending therebetween having a curved outline complementary to said curved outline top section of the lug, and
    wherein ends of the connection portion come into abutment on parts of said intermediate portion located apart from said top section, so that the protection piece is prevented from moving in rotation relative to the corresponding lug.

8. A device according to claim 7, wherein the two walls of the protection piece extend over different radial extents, an extent of one of the walls covering the outside face of the lug being greater than an extent of the other of the walls that terminates radially short of the shouldered pin.

9. A device according to claim 8, wherein the other wall includes a concave curved inside peripheral edge surrounding a portion of an annular rim of the orifice of the lug through which the shouldered pin passes.

10. A device for suspending a turbojet casing, the device comprising:
    a shouldered pin extending through aligned orifices of two lugs of a clevis secured to the casing, each lug having an inside face, an outside face, and an intermediate portion extending between said inside and outside faces, said intermediate portion having, at a top section, a curved outline centered on an axis of said aligned orifices which are adapted for passing therethrough the shouldered pin; and
    a protection piece for providing protection against wear mounted on each lug and that has the shouldered pin passing therethrough,
    wherein said protection piece comprises two parallel walls and a connection portion extending therebetween having a curved outline complementary to said curved outline top section of the lug,
    wherein ends of the connection portion come into abutment on parts of said intermediate portion located apart from said top section, so that the protection piece is prevented from moving in rotation relative to the corresponding lug,
    wherein the two parallel walls of the protection piece extends over different radial extents, an extent of one of said two parallel walls covering the outside face of the lug being greater than an extent of the other of said two parallel walls that terminates radially short of the shouldered pin, and
    wherein said other of said two parallel walls includes a concave curved inside peripheral edge surrounding a portion of an annular rim of the orifice of the lug through which the shouldered pin passes.

* * * * *